US012204535B1

(12) United States Patent
Molin et al.

(10) Patent No.: US 12,204,535 B1
(45) Date of Patent: Jan. 21, 2025

(54) SQL PRIMITIVES FOR HYPERSCALE PYTHON MACHINE LEARNING MODEL ORCHESTRATION

(71) Applicant: Teradata US, Inc, San Diego, CA (US)

(72) Inventors: Denis Molin, Draveil (FR); Christopher Ian Hillman, Sutton (GB); Jean-Charles Ravon, Cannes (FR); Alexander Smirnov, Amsterdam (NL); Zunnoor Tarique, Järfälla (SE)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/097,960

(22) Filed: Jan. 17, 2023

(51) Int. Cl.
*G06F 16/2453* (2019.01)
*G06F 16/242* (2019.01)
*G06F 16/2455* (2019.01)

(52) U.S. Cl.
CPC .... *G06F 16/24534* (2019.01); *G06F 16/2425* (2019.01); *G06F 16/2456* (2019.01)

(58) Field of Classification Search
CPC .......... G06F 16/24534; G06F 16/2425; G06F 16/2456
See application file for complete search history.

(56) References Cited

U.S. PATENT DOCUMENTS

| 8,719,369 | B1* | 5/2014 | Brown ............... | H04M 3/53383 |
| | | | | 379/88.16 |
| 10,922,423 | B1* | 2/2021 | Rungta ............... | G06F 21/604 |
| 2006/0047679 | A1* | 3/2006 | Purdy .................. | G06F 9/4493 |
| | | | | 707/999.102 |
| 2022/0403335 | A1* | 12/2022 | Wolf ................... | G16B 5/30 |

OTHER PUBLICATIONS

Aakriti Sharma, Jan. 24, 2022, Medium, "Joins in SQL", https://medium.com/@aakriti.sharma18/joins-in-sql-4e2933cedde6 (Year: 2022).*
Oracle Data Mining User's Guide, Oracle, Nov. 2020 (Year: 2020).*
Article in Oracle Machine Learning for SQL User's Guide entitled "5.2 The CREATE_MODEL Procedure," found at https://docs.oracle.com/en/database/oracle/oracle-database/19/dmprg/CREATE_MODEL-procedure.html#GUID-118AFEE7-C6D3-4DB9-A05A-59275EEA7BF4.
Article in SAP HANA's Automated Predictive Library Developer Guide entitled "CREATE_MODEL," found at https://help.sap.com/docs/apl/7223667230cb471ea916200712a9c682/4a5b7ce1a517435882f758655905ce00.html?version=2105.

(Continued)

*Primary Examiner* — Allen S Lin
(74) *Attorney, Agent, or Firm* — Howard Speight

(57) ABSTRACT

A SQL query performs a function. The SQL query includes a SQL operator that has two input relations. The first input relation is a script relation having a plurality of script records. Each script record includes a transformation field, the contents of which specify a transformation to be performed by the SQL operator. The second input relation is a parameter relation having a plurality of parameter records. Each parameter record includes a data-to-process field that identifies data to be processed by the transformation specified in the transformation field of a selected script record. The selected script record is determined by a mapping. The SQL operator has one output relation having a plurality of output records. Each output record contains the result of transformation specified in a respective selected script record using the data to be processed identified in the data-to-be-processed field in a respective selected parameter record.

20 Claims, 11 Drawing Sheets

(56) References Cited

OTHER PUBLICATIONS

Article in BigQuery ML documentation entitled "CREATE MODEL statement," found at https://cloud.google.com/bigquery-ml/docs/reference/standard-sql/bigqueryml-syntax-create?hl=fr.

Article in AWS Database Developer Guide entitled "CREATE MODEL," found at https://docs.aws.amazon.com/redshift/latest/dg/r_CREATE_MODEL.html.

Article in Microsoft documentation entitled "Python tutorial: Train and save a Python model using T-SQL," found at https://docs.microsoft.com/en-us/sql/machine-learning/tutorials/python-taxi-classification-train-model?view=sql-server-ver16.

* cited by examiner

```
{'sto_parameters': {'columnnames': ['relative_time',
   'LIGO_Livingston',
   'LIGO_Hanford',
   'Virgo'],
  'float_columnames': ['LIGO_Livingston', 'LIGO_Hanford', 'Virgo'],
  'integer_columnames': ['relative_time'],
  'category_columns': []},
 'model_parameters': {'columns': ['LIGO_Livingston', 'LIGO_Hanford']}}
```

FIG. 6B

```
1   from sklearn.preprocessing import StandardScaler
2   from sklearn.decomposition import PCA
3   from sklearn.linear_model import LogisticRegression
4   from sklearn.compose import ColumnTransformer
5   from sklearn.pipeline import Pipeline
6   from sklearn.metrics import accuracy_score, auc, roc_curve
7
8   class MyModel:
9       def __init__(self, features=['Virgo_max', 'Virgo_mean',
10        'LIGO_Hanford_max',/ 'LIGO_Hanford_mean',
11        'LIGO_Livingston_max', 'LIGO_Livingston_mean'], target = 'target',pca = 0.95):
12          self.features = features
13          self.target = target
14          self.pca = pca
15          self.model = Pipeline([
16                  ('scaler', StandardScaler()),
17                  ('pca',PCA(self.pca)),
18                  ('lr', LogisticRegression())])
19          self.accuracy = -1
20          self.auc = -1
21          return
22      def get_model_type(self):
23          # give a model type name for metadata storage
24          return 'logistic regression'
25      def get_description(self):
26          # give the list of relevant hyper parameters for metadata storage
27          res = {}
28          res['accuracy'] = self.accuracy
29          res['auc'] = self.auc
30          return str(res).replace("'","")
31      def fit(self, df_local):
32          self.model.fit(df_local[self.features],df_local[self.target])
33          self.accuracy = accuracy_score(df_local[self.target].astype('category'), /
34                  self.model.predict(df_local[self.features]))
35          fpr, tpr, thresholds = roc_curve(df_local[self.target], /
36                  self.model.predict_proba(df_local[self.features])[:,1])
37          self.auc = auc(fpr, tpr)
38          return
39      def score(self, df_local):
40          df_local['proba'] = self.model.predict_proba(df_local[self.features])[:,1]
41          return df_local
```

FIG. 6C

SQL PRIMITIVES FOR HYPERSCALE PYTHON MACHINE LEARNING MODEL ORCHESTRATION

BACKGROUND

Orchestrating a machine learning model in production is something that is well understood. It involves managing four processes: model creation, model training, model scoring, and model evaluation. It is challenging to manage this orchestration in production and to connect the resulting models to the data foundation on one hand to the decision process on the other. There are many tools and frameworks available on the market to manage and automate these processes, with mixed success and ease.

It is a challenge to provide a scalable solution to manage and automate these processes for thousands or millions of machine learning models.

SUMMARY

In one aspect, a method includes executing a SQL query to perform a function. The SQL query includes a SQL operator. The SQL operator has two input relations. The first input relation is a script relation having a plurality of script records. Each script record includes a transformation field. The contents of the transformation field specify a transformation to be performed by the SQL operator. The second input relation is a parameter relation having a plurality of parameter records. Each parameter record includes a data-to-process field that identifies data to be processed by the transformation specified in the transformation field of a selected script record. The selected script record is determined by a mapping. The SQL operator has one output relation having a plurality of output records. Each output record contains the result of transformation specified in a respective selected script record using the data to be processed identified in the data-to-be-processed field in a respective selected parameter record. The selection of the selected script record and the selection of the selected parameter record for each output record are determined by a mapping between the script records and the parameter records. The SQL query includes an ON clause that provides the mapping according to standard SQL usage dealing with JOIN operators.

Implementations may include one or more of the following. The SQL query may include a WHERE clause that filters the mapping according to standard SQL usage dealing with JOIN operators. The transformation may be to instantiate a plurality of models. The transformation may be to train a plurality of instantiated models. The transformation may be to score a plurality of trained models. Each parameter record may include a runtime parameters field that specifies a runtime environment for the transformation. Each script record may include a runtime parameters field that specifies a runtime environment for the transformation. The contents of the transformation field may include a serialized script or a serialized object (e.g., a Python object). The contents of the data-to-process field may be serialized.

In one aspect, a non-transitory computer-readable tangible medium has recorded on it a computer program. The computer program include executable instructions, that, when executed, perform a method. The method includes executing a SQL query to perform a function. The SQL query includes a SQL operator. The SQL operator has two input relations. The first input relation is a script relation having a plurality of script records. Each script record includes a transformation field. The contents of the transformation field specify a transformation to be performed by the SQL operator. The second input relation is a parameter relation having a plurality of parameter records. Each parameter record includes a data-to-process field that identifies data to be processed by the transformation specified in the transformation field of a selected script record. The selected script record is determined by a mapping. The SQL operator has one output relation having a plurality of output records. Each output record contains the result of transformation specified in a respective selected script record using the data to be processed identified in the data-to-be-processed field in a respective selected parameter record. The selection of the selected script record and the selection of the selected parameter record for each output record are determined by a mapping between the script records and the parameter records. The SQL query includes an ON clause that provides the mapping according to standard SQL usage dealing with JOIN operators.

In one aspect, a method includes performing a process involving executing multiple SQL queries to perform respective functions. Each SQL query includes a SQL operator. The SQL operator has two input relations. The first input relation is a script relation having a plurality of script records. Each script record includes a transformation field. The contents of the transformation field specify a transformation to be performed by the SQL operator. The second input relation is a parameter relation having a plurality of parameter records. Each parameter record includes a data-to-process field that identifies data to be processed by the transformation specified in the transformation field of a selected script record. The selected script record is determined by a mapping. The SQL operator has one output relation having a plurality of output records. Each output record contains the result of transformation specified in a respective selected script record using the data to be processed identified in the data-to-be-processed field in a respective selected parameter record. The selection of the selected script record and the selection of the selected parameter record for each output record are determined by a mapping between the script records and the parameter records. The SQL query includes an ON clause that provides the mapping according to standard SQL usage dealing with JOIN operators. The transformation performed by the SQL operator in a first execution is a model instantiation process. The transformation performed by the SQL operator in a second execution is a model training process. The transformation performed by the SQL operator in a third execution is a model scoring process.

Implementations may include one or more of the following. The first execution may generate untrained models. The second execution may generate trained models from the untrained models. The third execution may generate scores for the trained models.

BRIEF DESCRIPTION OF THE DRAWINGS

FIG. 6B is an example of parameters used to instantiate an untrained model.

FIG. 6C is an example of a script that implements a generic class of machine learning model written in Python 3.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

An Example Computer System

Figure 1:
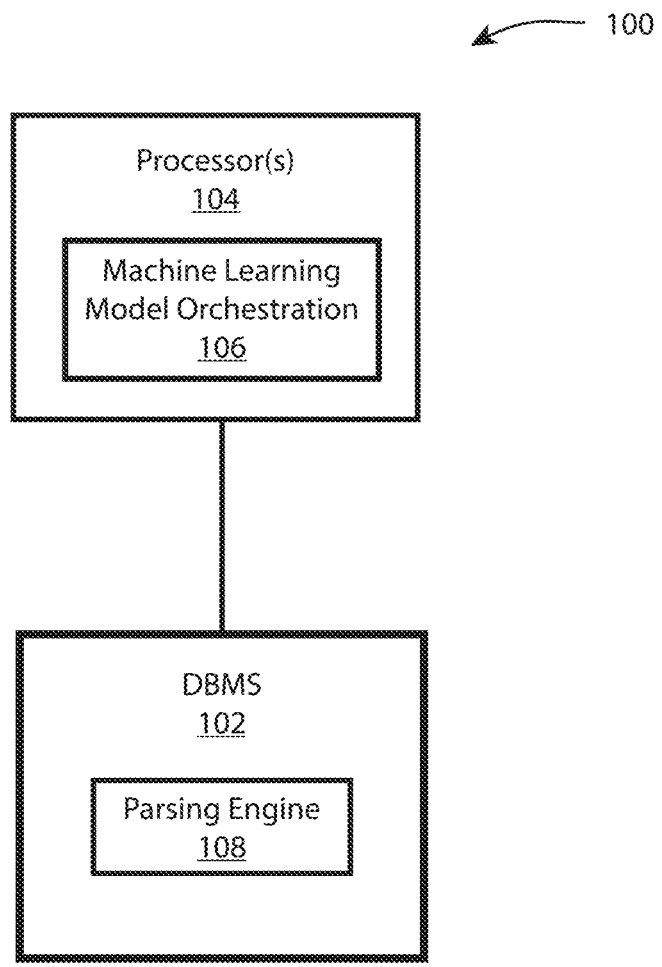
FIG. 1 is a block diagram of one example system.

The techniques disclosed herein have particular application to, but are not limited to, systems such as the system 100 illustrated in FIG. 1. The system 100 includes a variety of hardware components and software components that may be deployed on an appliance, on commodity hardware, in a private cloud, in a public cloud, in a combination of public and private clouds, and/or in a multi-cloud where cloud users are allowed services from multiple cloud vendors such as Amazon (AWS), Google (GCP), and Microsoft (Azure). The software components are programmed as executable instructions into memory and/or a non-transitory computer-readable medium for execution on the hardware components (including, for example, hardware processors). The system 100 includes one or more network connections; the networks can be wired, wireless, or a combination of wired and wireless.

The system 100 implements, among other things, the processing described below in connection with FIGS. 1-14.

An Example Database Management System

The system 100 includes a Database Management System (DBMS) 102, at least one hardware processor 104, and a non-transitory computer-readable storage medium having executable instructions representing a machine learning model orchestration technique 106 as disclosed herein. The one or more hardware processors 104 may be distributed across numerous physical locations connected by network connections as described above. The machine learning model orchestration technique 106 may run in a Python environment that runs on the one or more hardware processors 104. The DBMS 102 may be a relational DBMS (RDBMS) or it may be another variety of database management system.

The DBMS 102 may include a parsing engine 108, discussed below in connection with FIGS. 2 and 3, that organizes the storage of data and the distribution of database table rows and coordinates the retrieval of data from the data-storage facilities in response to queries received from a user. The DBMS 100 usually receives queries and commands to build tables in a standard format, such as SQL. The word "table," as used herein, is intended to include a "view," which is a subset of a RDBMS, or a query result. Collectively, tables, views, or query results are referred to as "relations." Further, the word "row" is used herein interchangeably with the word "record." A row or a record may be segmented into a number of fields.

Figure 2:
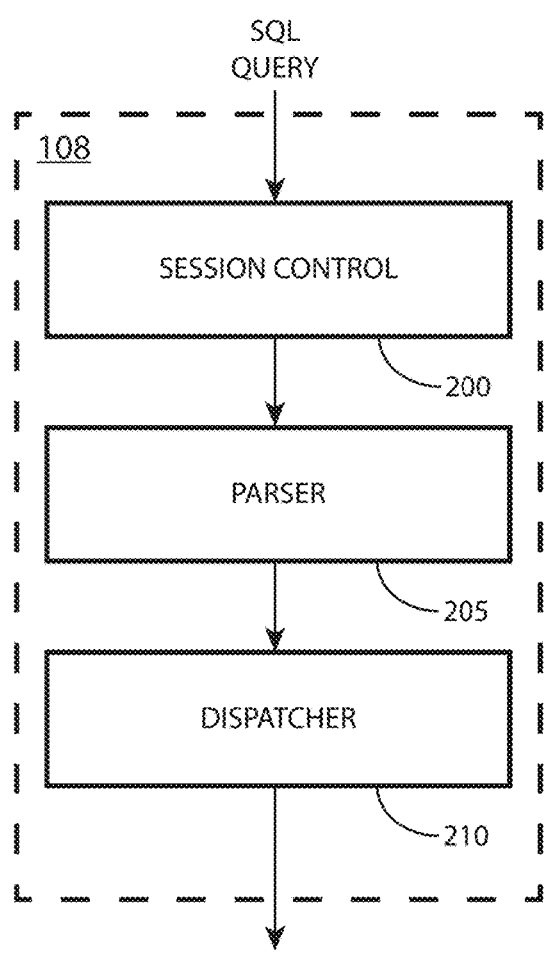
FIG. 2 is one example of a block diagram of a parsing engine.
Figure 3:
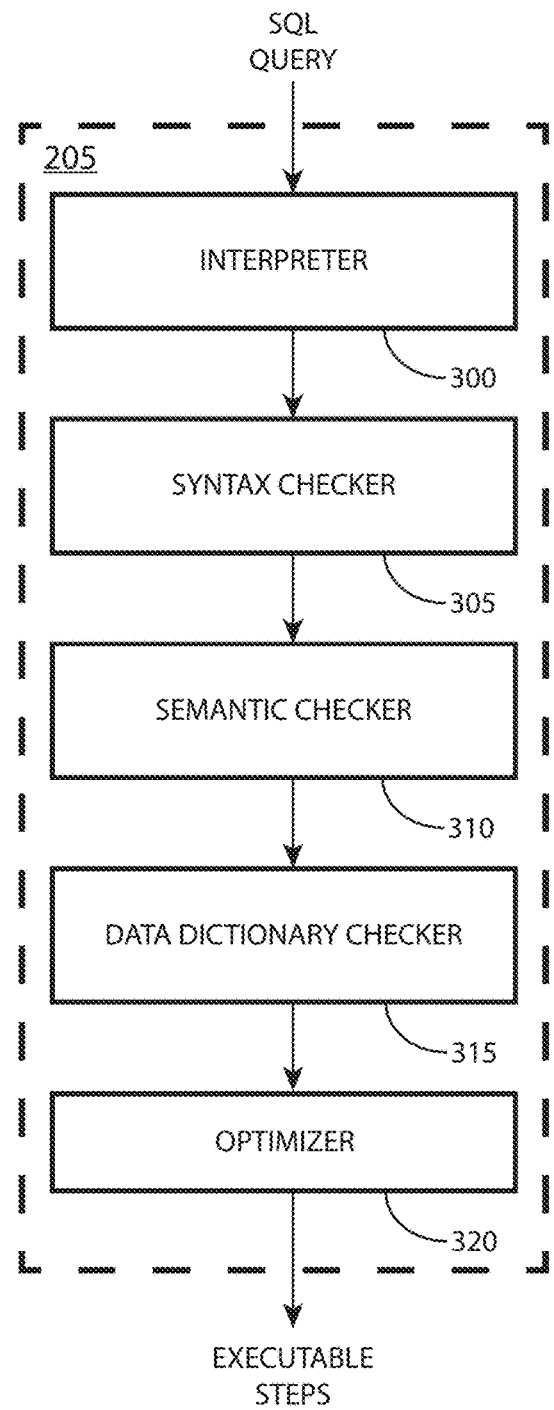
FIG. 3 is a flow chart of a parser.
Figure 4:
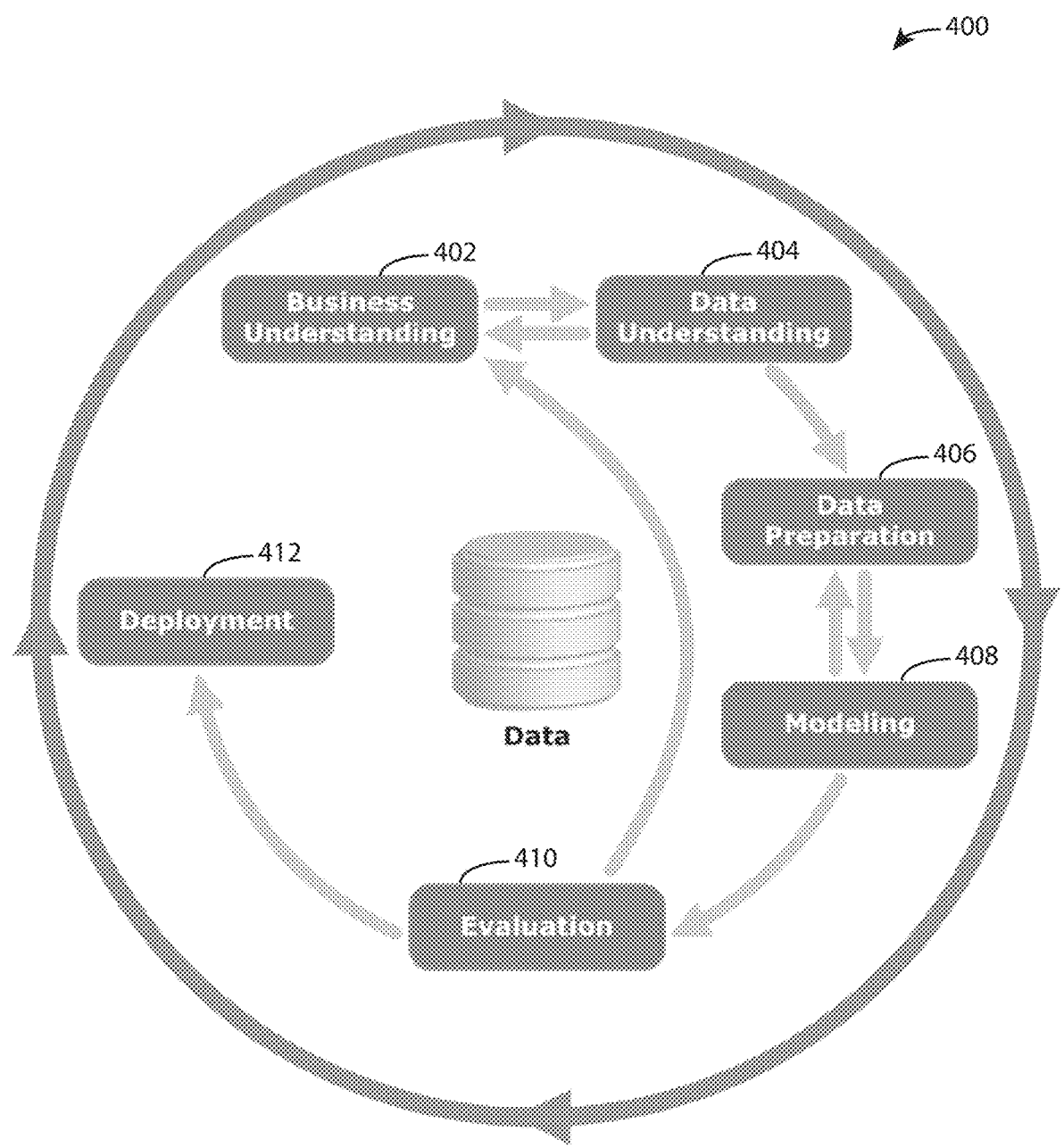
FIG. 4 illustrates the process of data mining.

Once the session control 200, shown in FIG. 2, allows a session to begin, a user may submit a SQL query. More broadly, the user may submit a "request," a term that includes database queries, which are processed by the DBMS to produce an output result, and other DBMS actions, such as load utilities to load data from a source to a target, etc. Typically, a query includes one or more predicates. Query predicates, or logical predicates, are types of conditional expressions that specify a condition of a row or group of rows that has one of three possible states: TRUE, FALSE, or NULL (or unknown).

The SQL query is routed to the parser 205. As illustrated in FIG. 3, the parser 205 interprets the SQL query 300, checks it for proper SQL syntax 305, evaluates it semantically 310, and consults a data dictionary to ensure that all the objects specified in the SQL query actually exist and that the user has the authority to perform the request 315. Finally, the parser 205 runs an optimizer 320, which develops a query execution plan (QEP) to perform the query and produces executable steps to execute the QEP. A dispatcher 210, shown in FIG. 2, issues commands to implement the executable steps.

Machine Learning Model Orchestration

The most widely used analytics model is the Cross-Industry Standard Process for Data Mining (CRISP-DM). It is an open standard process model that describes common approaches used by data mining experts. CRISP-DM breaks the process of data mining 400 illustrated in FIG. 4, which was copied from https://en.wikipedia.org/wiki/Cross-industry_standard_process_for_data_mining, into six major phases. The phases include business understanding 402, data understanding 404, data preparation 406, modeling 408, evaluation 410, and deployment 412. This disclosure focuses on the four latter phases of this process: data preparation 406, modeling 408, evaluation 410, and deployment 412.

The techniques described herein apply set theory to these four machine learning processes, in the same way that set theory has been applied to scale analytics. The techniques consider models and trained models as data, and the training, scoring and evaluation processes as operators. From a topological point of view these operators are like the LEFT JOIN operator in SQL.

The techniques include SQL interfaces for model instantiation, model training, model scoring and model evaluation, and can be used to scale machine learning model management in a database for hyperscale use cases or when managing models at the Enterprise scale.

The techniques may be useful, for example, to a business that has hundreds of geographically distributed stores each selling thousands of items. The business may want to forecast demand for each of the stores at the item level. The stores may keep sales histories but for new items there is no sales history. It would be helpful to create a separate machine learning model for each item for each store but the demand for different products varies among the stores.

Another possible application for the techniques described herein is for a business that has hundreds of welding machines performing dozens of different types of welds at over 100 factories. The business wishes to spot welding problems to alert quality and maintenance teams. It would be helpful to create a separate machine learning model for each welding machine and for each weld performed by each machine to track welding performance over time, but the performance of the welding machines is individual to each machine and perhaps even to the different welds performed by each machine.

Figure 5:
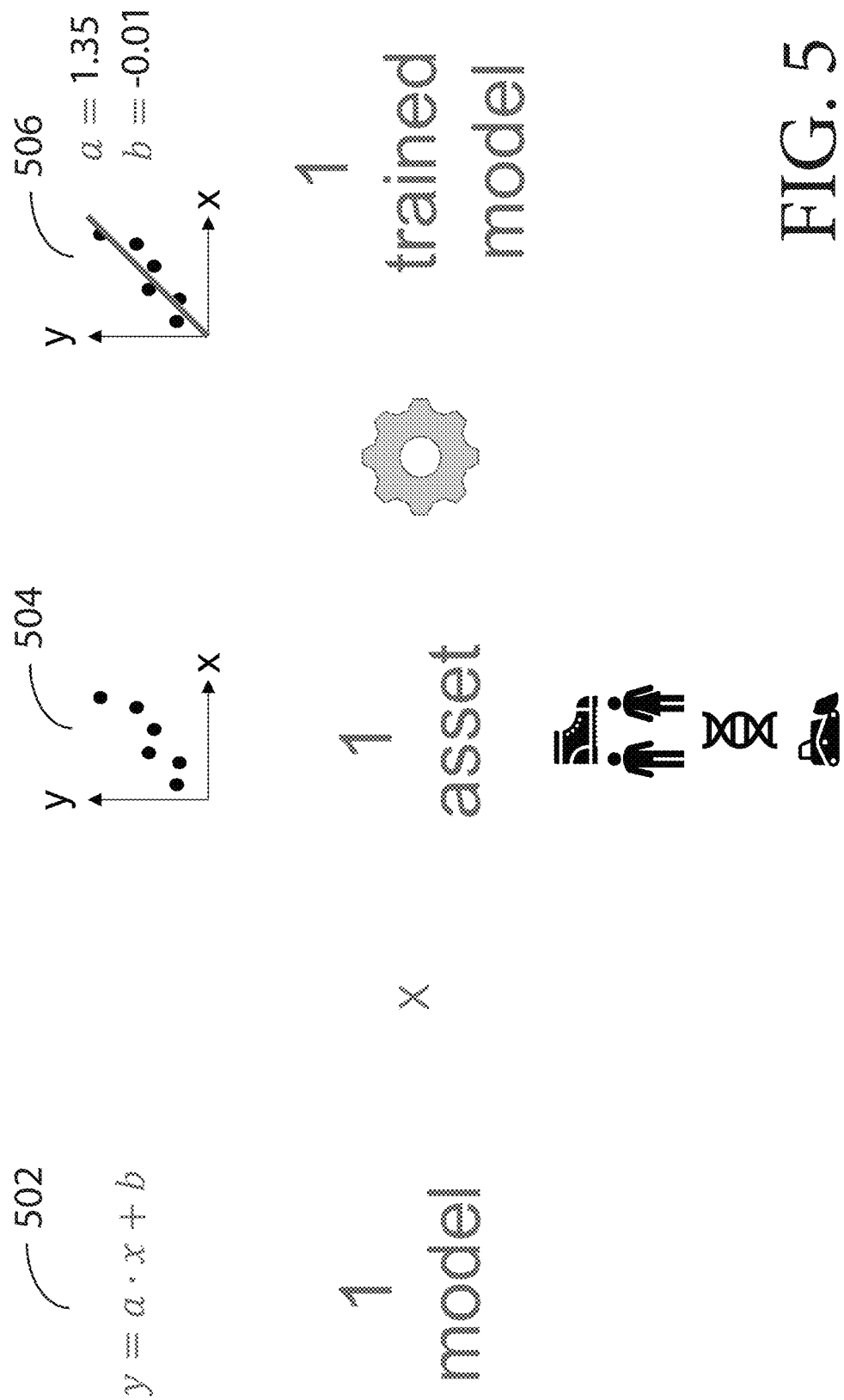
FIG. 5 illustrates creation of a model for one asset.

Creating a model for one asset, illustrated in FIG. 5, is well-understood. A model 502, e.g. "y=a·x+b", is developed to explain collected data 504 about a single asset. The model 502 is then analyzed against the data 504, using for example a regression analysis or the like, to produce a trained model, e.g., in which a=1.35 and b=−0.01. This becomes more complicated when the goal is to model a large number of assets, producing a large number of models, or when the assets are segmented, requiring a specific modeling approach for each segment.

The examples described above illustrate the problem with orchestrating machine learning models. In each example, a single machine learning model applied to all of the stores/items or welding machines/welds may not be appropriate because of the variations described. Creating a specific machine learning model for each store/item or welding machine/weld is a challenge.

Model Creation: The Untrained Model

Figure 6A:
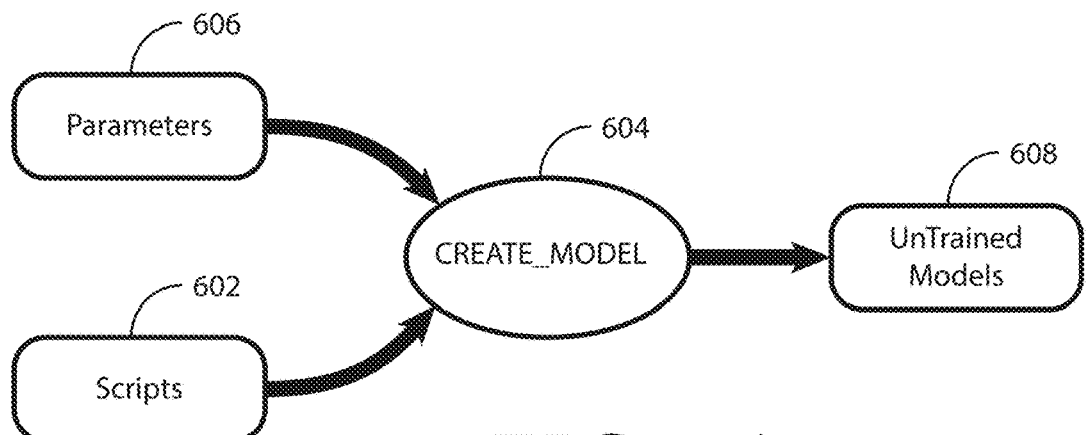
FIG. 6A illustrates the instantiation of a machine model from an algorithm.

FIG. 6A illustrates the instantiation of a machine model from an algorithm, which is the starting point of the machine learning model lifecycle. Consider the example of machine learning model written in the computer programming language Python. Typically, the algorithm takes the form of a Python script 602 (or multiple scripts, as shown in FIG. 6A) that depends on Python packages that contain the actual machine learning algorithm implementations (e.g. xgboost, random forest, one class SVM, . . . ). The script 602 is the upper layer that manages the instantiation as Python objects of one or several algorithms or data processing. This instantiation consists of calling the constructor 604 of these objects with a desired set of parameters 606 (e.g., the number of trees for a random forest), since the machine learning algorithms are parameterized (i.e., generalized through the use of input and output parameters). The result is stored in an untrained models table 608, with each row of the untrained models table 608 representing a single instantiated model.

FIG. 6B is an example of parameters used to instantiate an untrained model. In this example, the parameters are sorted in two subgroups:
 the first subgroup ("sto_parameters") deals with the information required to properly interpret the data the code will receive and the settings of the runtime environment (named sto_parameters in the parameters)
 the second subgroup ("model_parameters") deals with the parameters that actually drives the code execution itself (named mode_parameters in the example)

The sto_parameters show that the code expects to receive data in a table or data frame format made of 4 columns in this order with the following names: relative_time, LIGO-_Livingston, LIGO_Handford, Virgo. In the example shown in FIG. 6B, the code is written in Python 3. Therefore, it is recommended to specify the data type of the data contained in the different columns (in a table or a data frame the data type is defined by column, and so it applicable to the entire colum): float columnames lists the columns by name that have to be converted to the float python data type, integer-_columnames to the integer data type, and category_columns to the category data type. It will be understood that this is not an exhaustive list. Other parameters could be added depending on the targeted runtime environment and use case, e.g. dealing with Boolean, date, time, timestamp, or any customized data type managed by the target environment.

The model_parameters listed in FIG. 6B, "LIGO_Hanford" and "LIGO_Livingston," are the parameters that will be passed to the constructor of the class implemented in the Python code example. These parameters are represented in JSON to be converted in a dictionary in the Python runtime in order to drive the computations implemented in the code example we are discussing below.

FIG. 6C is an example of a script that implements a generic class of machine learning model written in Python 3. The example shown in FIG. 6C instantiates a model, including initializing an untrained model, training a model, scoring a model, and querying information from a model. It will be understood that, while the examples described herein are implemented in Python, the use of Python is not essential and should not be construed to limit the appended claims.

Then code implements a Python class with at least 3 methods:
 _init_: the constructor of the model. This is this method that will take as input the model_parameters dictionary described previously in connection with FIG. 6B. The constructor instantiates an untrained scikit learn pipeline that first scales the data with a StandardScaler, then projects the scaled data on a subset of the principal components using PCA, and finally applies a logistic regression.
 fit: a method that implements the model training. In this example, it consists of running the fit method of the scikit learn pipeline on data passed in the df_local argument, and stores the trained model and some evaluation metrics in the model object attributes (self.model, self.accuracy, etc.)
 score: a method that implements model inference or model scoring. In this example, it runs the predict method of the scikit learn pipeline and outputs a data frame that contains the results of the prediction. In addition, it adds a column named proba to the input data frame df_local.

Two other methods have been implemented that optionally return information about the model such as a string containing the model type (get_mode_type) or information related to the training process such as the model accuracy and AUC obtained on the training set (get_description). These optional functions output metadata dealing with the trained model.

The MyModel class provides an interface to perform:
 model instantiation: model=MyModel ( model_parameters) (note that the  operator in Python allows unpacking of key-value pairs into keyword arguments in a function call, here the constructor of MyModel).
 model training: model.fit (training_dataframe) model scoring: model.score (scoring_dataframe)

Lines 1 through 6 are import statements to make the referenced modules (e.g., "StandardScaler") available.

Line 8 creates the "MyModel" class. This is the constructor for the MyModel class.

Lines 9-21 the _init_method for the MyModel class, which is called when an object is created from the MyModel class; here it is called when an untrained model is created from the MyModel class.

Lines 9-11 define the arguments for the MyModel class. Argument "self" itself has three arguments: "features", "target", and "pca". By default, the features argument itself is a Python list of values: "Virgo_max", "Virgo_mean", "LIGO_Hanford_max," LIGO_Hanford_mean," "LIGO_Livingston_max," and "LIGO_Livingston_mean." The model instantiation previously mentioned will overwrite the default list when the model_parameters dictionary contains a features key with another list of feature names.

Lines 12-21 initialize the MyModel class:

Line 12 binds the self.features argument to a features attribute.

Line 13 binds the self.target argument to the target attribute.

Line 14 binds the self.pca argument to the pca attribute.

Lines 15-18 establish a pipeline of transforms and an estimator. The transforms are StandardScaler( ) and PCA. The StandardScaler( ) transform normalizes the input data so that the mean of each column is 0 and the standard deviation of each column is 1. The PCA (self.pca) transform chooses the minimum number of components in the pipeline such that a specified percentage (95% in the illustrated case because pca is set to 0.95 in line 11) of the variance in the data is retained. The PCA transform increases the speed of processing. The LogisticRegression( ) transform implements a regularized logistic regression using defaults, including using the lbfgs (software for large-scale Bound-constrained Optimization) default solver. It will be understood that the pipeline can be different from this example and can use any transform available in Python or outside Python.

Line 19 initializes an accuracy argument to −1, updated in the fit method discussed below.

Line 20 initializes an auc argument to −1, updated in the fit method discussed below.

Line 21 returns from the initialization method.

Lines 22-24, as the comment on line 23 indicates, return a model type name for metadata storage. In the example shown, the model type is "logistic regression."

Lines 25-30 return a list of evaluation factors for metadata storage.

Lines 31-38 define a "fit" method. The arguments for the fit method are self and df_local. Line 35 calls the self.model.fit method with input df_local [self.features] and output df_local [self.target]. The fit method executes the transforms in the pipeline defined above in connection with lines 15-18 and fits the data per the LogisticalRegression transform in line 18.

Lines 33-37 compute the accuracy and the Area Under the ROC Curve (AUC) of the trained model determined in the training set df_local.

Line 38 returns from the "fit" method.

Lines 39-41 implement the scoring of the model on new data df_local. The trained model is inferred on the scoring data df_local passed as a second argument. The results of the scoring, the predictions, are stored in a new column named 'proba' added the scoring dataframe df_local. The method returns the df_local with new proba column.

Figure 7:
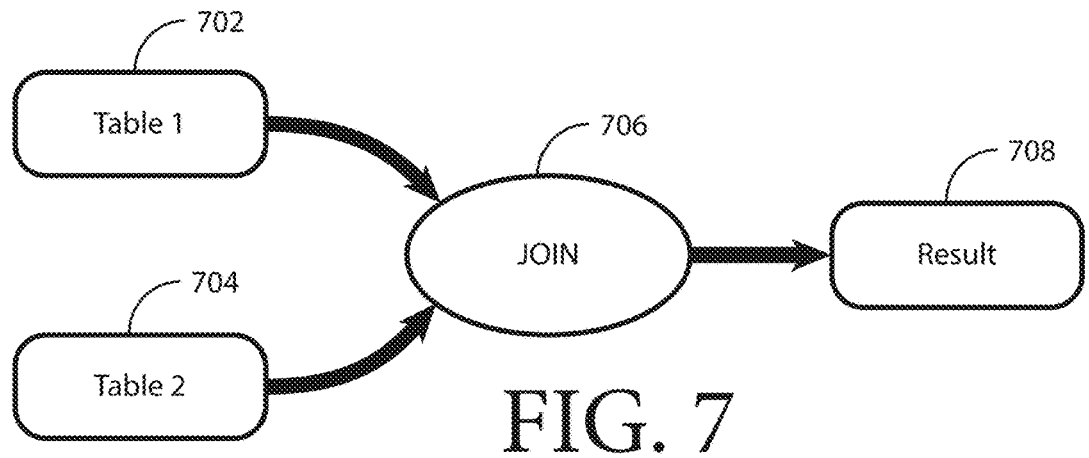
FIG. 7 illustrates the topology of a JOIN operator.
Figure 8:
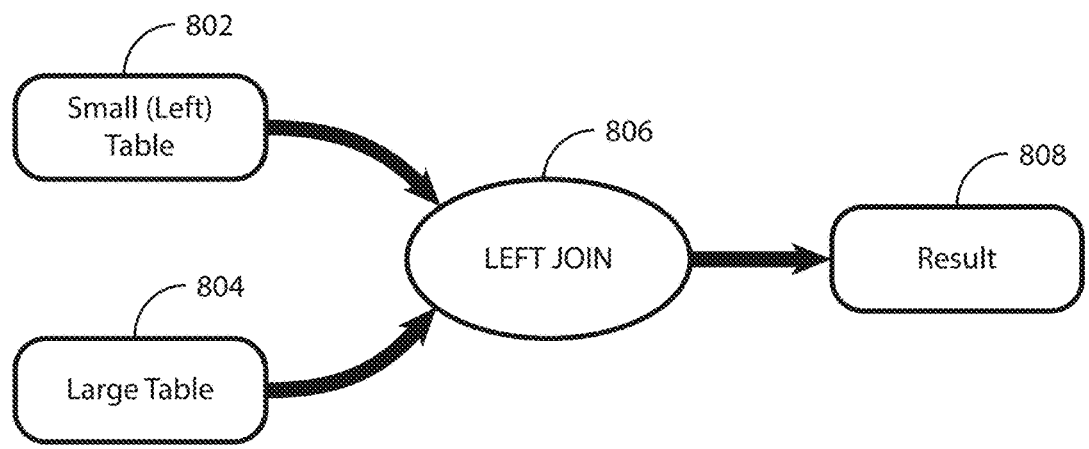
FIG. 8 illustrates the topology of the LEFT JOIN operator.

The topology of the instantiation of a machine model, in FIG. 6, is similar to the topology of the JOIN operator, which is illustrated in FIG. 7 (with Table 1 702 and Table 2 704 being JOINED 706 to produce a result 708), and even a LEFT JOIN operator, which is illustrated in FIG. 8 (with a Small (Left) Table 802 and a Large Table 804 being LEFT JOINED 806 to produce a result 808), considering the lack of symmetry of the inputs. That is, the scripts table 602 is smaller than the parameters table 606 similar to the small (left) table 802 being smaller than the large table 804, because there are likely one set of parameters per asset or segment of assets. As a result, when "Parameters" 606 and "Scripts" 602 are considered as two tables, the model creation can be written in SQL as shown below, replacing the LEFT JOIN verb by CREATE_MODEL. The ON clause defines how to pair scripts and parameters, knowing that a given script can be instantiated with a plurality of parameters.

SELECT
   A.ID--ID of the script
   , B.ID--ID of the parameters
   , RESULTS.ID--unique ID of the untrained model
   , RESULTS.UNTRAINED_MODEL--The BLOB containing the untrained model
FROM SCRIPTS A
CREATE_MODEL PARAMETERS B
ON A.ID=B.SCRIPT_ID
WHERE [ . . . ]

The minimal Parameter table definition (i.e., the Parameter table contains at least this set of columns, regardless of their names; other columns are also possible) is:
   ID: unique ID for each record (or row) in the Parameter table.
   ID_Script: the ID of the Script the set of parameters can be applied to
   Parameters: a JSON (JavaScript Object Notation) object containing the parameters.

The minimal Script table definition (i.e., the Script table contains at least this set of columns, regardless of their names; other columns are also possible) is:
   ID: unique ID for each record (or row) in the Script table
   Script: a CLOB (Character Large Object) containing the Python or R script (where "R" is a programming language)

JSON and CLOB are examples of data types to store parameters and scripts. As a consequence, the ON CLAUSE in the query recited above could be more complex when the A.ID and B.SCRIPT_ID are both made of several columns. The purpose of the ON CLAUSE is to pair scripts and parameters.

For sake of simplicity, it is assumed that there is a single Python or R environment. It will be understood, however, that additional environments fall within the scope of the appended claims.

Note that the "Parameter" and "Script" tables may be temporal and contain additional columns, for instance, with metadata that would provide additional information regarding dependency and recommended environment, author, version, project, etc. A temporal database management system is defined to be a database management system with built-in support for reasoning with time such as a temporal data model and a temporal version of SQL. A discussion of temporal databases and data types is found, for example, in U.S. patent application Ser. No. 17/078,997, entitled Join Elimination Enhancement for Real World Temporal Applications, filed on Oct. 23, 2020, incorporated by reference.

The CREATE_MODEL operator runs a Python job against all the rows in parallel. This job imports the script in the script columns, and calls the constructor of the object with the proper parameter set and returns a Python object may need to be serialized for storage (using e.g. pickle, dill, joblib, ONNX or PMML converter, etc.) in the RESULT set.

Here it can be seen that, with a single query, a plurality of models can be instantiated using different scripts and parameters sets. This operation does not depend on the number of models to create. The number of models depends on the content of the Parameters and Scripts tables, the ON clause logic that pairs (or maps) the parameters with the scripts and any WHERE clause, which filters the mapping. The ON and WHERE clauses conform to and operate as per standard SQL usage dealing with JOIN operators. That is, an ON clause may include a predicate to designate the inputs to the operator (e.g., A.PARTITION_ID=B.PARTITION_ID in the above example). A WHERE clause may include a predicate to filter the inputs determined by the ON clause. In general, the SQL operators described herein (i.e., CREATE_MODEL, TRAIN_MODEL, and SCORE_MODEL) operate within the standard SQL usage dealing with JOIN operators.

The obtained models, stored in an untrained models table, at this stage are untrained. The next step is to train the untrained models.

Model Training

Figure 9:
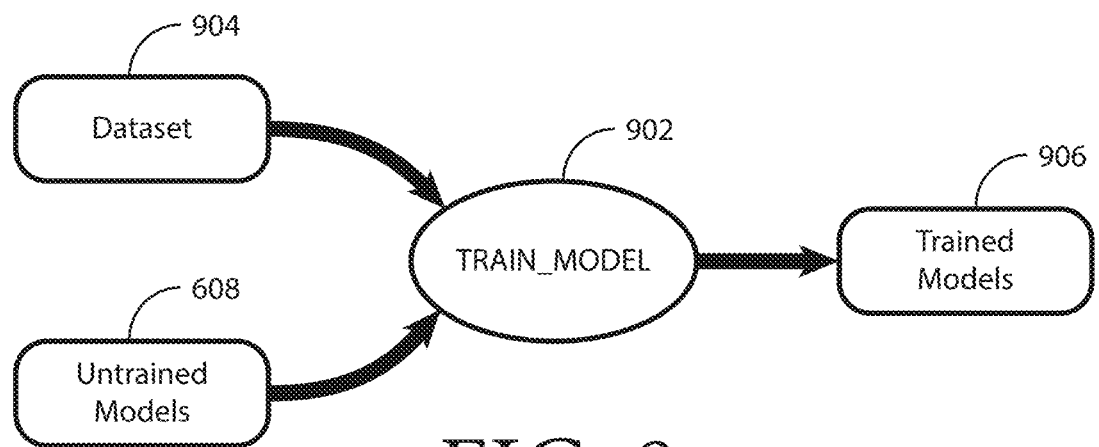
FIG. 9 illustrates the topology of a TRAIN_MODEL operator.

FIG. 9 illustrates the topology of a TRAIN_MODEL operator. Again, as with model instantiation, the topology is similar to a LEFT JOIN operator. A TRAIN_MODEL operator 902 accepts a dataset 904 and untrained models table 608 as inputs and generates a trained models table 906.

The TRAIN_MODEL operator is invoked with a SQL query:
SELECT
    A.ID--unique ID of the row in the dataset
    , A.PARTITION_ID--ID of the partition of the dataset
    , B.ID--ID of the untrained model
    , RESULTS.ID--unique ID of the trained model
    , RESULTS.TRAINED_MODEL--The BLOB containing the untrained model
FROM DATASET A
TRAIN_MODEL UNTRAINED_MODEL B
ON A.PARTITION_ID=B.PARTITION_ID
WHERE [ . . . ]

Note that this SQL query illustrates hyperscale use case, meaning that the dataset is made of a plurality of segments, i.e. partitions, and the goal is to train different models for different partitions. It is possible to train several models on the same partition.

The TRAIN_MODEL operator runs a Python job per (partition, untrained model ID) pair, all in parallel. Each Python job trains the untrained model on the partition of the data that is attributed to it according to the mapping rules expressed in the ON clause. When the untrained models are in a serialized form, they may have to be deserialized before being trained.

The query does not depend on the number of trainings to be performed. As such, thousands or millions of models can be managed with a single query. The number of models depends on the content of the dataset 904 and untrained model table 608, the ON clause logic that pairs (or maps) the dataset partitions with rows (i.e., untrained models) in the untrained models table 608 and any WHERE clause, which filters the mapping.

Note that RESULT can also contain relevant metrics on the training process itself, such as model performance on the training set, training duration in CPU second, memory usage, errors and warnings, etc. The RESULT is stored in the trained models table 906, with one trained model per row in the trained model table 906.

The next step is to score the models.

Model Scoring

Figure 10:
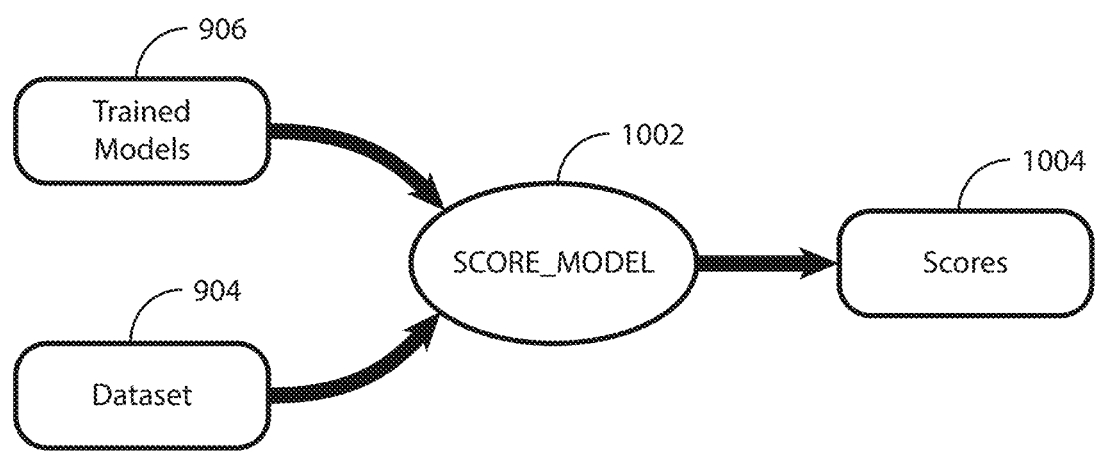
FIG. 10 illustrates the topology of a SCORE_MODEL operator.

FIG. 10 illustrates the topology of a SCORE_MODEL operator. As can be seen, as with model instantiation and model training, the topology is similar to a LEFT JOIN operator. The SCORE_MODEL operator is similar to the MODEL_TRAINING operator. However, instead of outputting Python objects, the SCORE_MODEL operator outputs data. A SCORE_MODEL operator 1002 receives the trained models table 906 and the same dataset 904 that was used to train the models and generates a scores table 1004.

The MODEL_SCORING operator is invoked with a SQL query:
SELECT
    A.ID--unique ID of the row in the dataset
    , A.PARTITION_ID--ID of the partition of the dataset
    , B.ID--ID of the trained model
    , RESULTS.SCORES--A JSON containing the scoring results
FROM DATASET A
SCORE_MODEL TRAINED_MODEL B
ON A.PARTITION_ID=B.PARTITION_ID
WHERE [ . . . ]

The SCORE_MODEL operator runs a Python job per (data partition, trained model) pair, all in parallel. The Python job deserializes the trained model contained in the TRAINED_MODEL table and runs the predict method of the object against the corresponding data partition, and returns the results in a JSON format, to cope with models returning multiple outputs. The JSON could also be replaced by multiple output rows, each row corresponding to a JSON key-value pair. The results are stored in the scores table 1004, with one or multiple rows or records per model.

The query does not depend on the number of models to be scored. The number of scores depends on the content of the trained models table 906 and the dataset table 904, the ON clause logic that pairs (or maps) the DATASET partitions with the untrained models and any WHERE clause, which filters the mapping.

Model Evaluation

Model evaluation is performed using conventional SQL queries.

Overview

Figure 11:
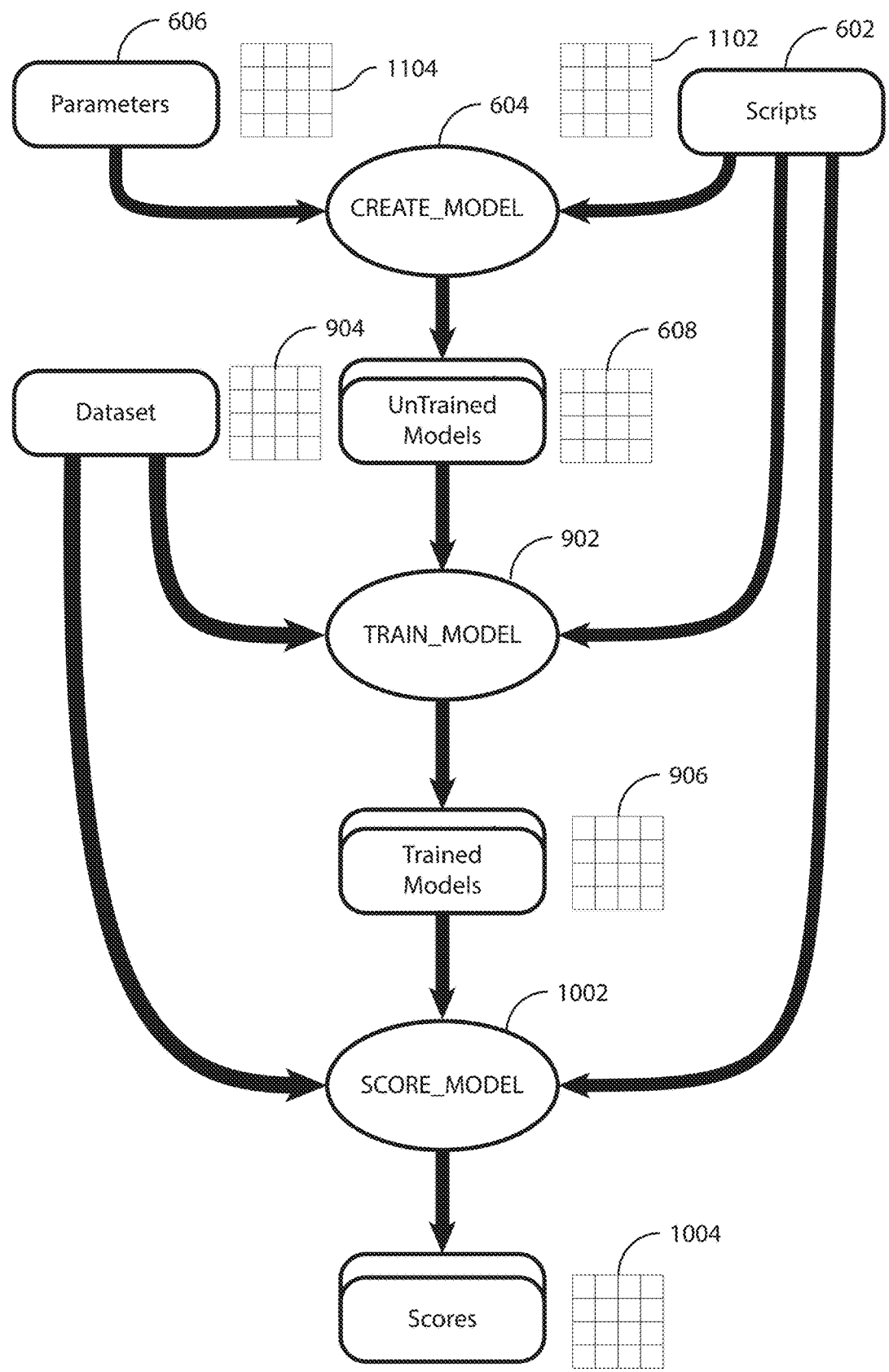
FIG. 11 is an overview of creating, training, and scoring models.

FIG. 11 is an overview of creating, training, and scoring models. FIG. 11 pulls together the concepts illustrated in FIGS. 6A, 9, and 10.

Untrained models 608 are created using CREATE_MODEL scripts 604 included in scripts 602 stored in a scripts table 1102 and parameters 606 stored in a parameters table 1104. TRAIN_MODEL scripts 902 included in scripts 602 stored in the scripts table 1102 and data from the dataset 904 are used to create trained models 906. SCORE_MODEL scripts 1002 included in the scripts 602 stored in the scripts table 1102 and data from the dataset 904 are used to generate scores 1004 for the trained models 906.

The Process

Figure 12:
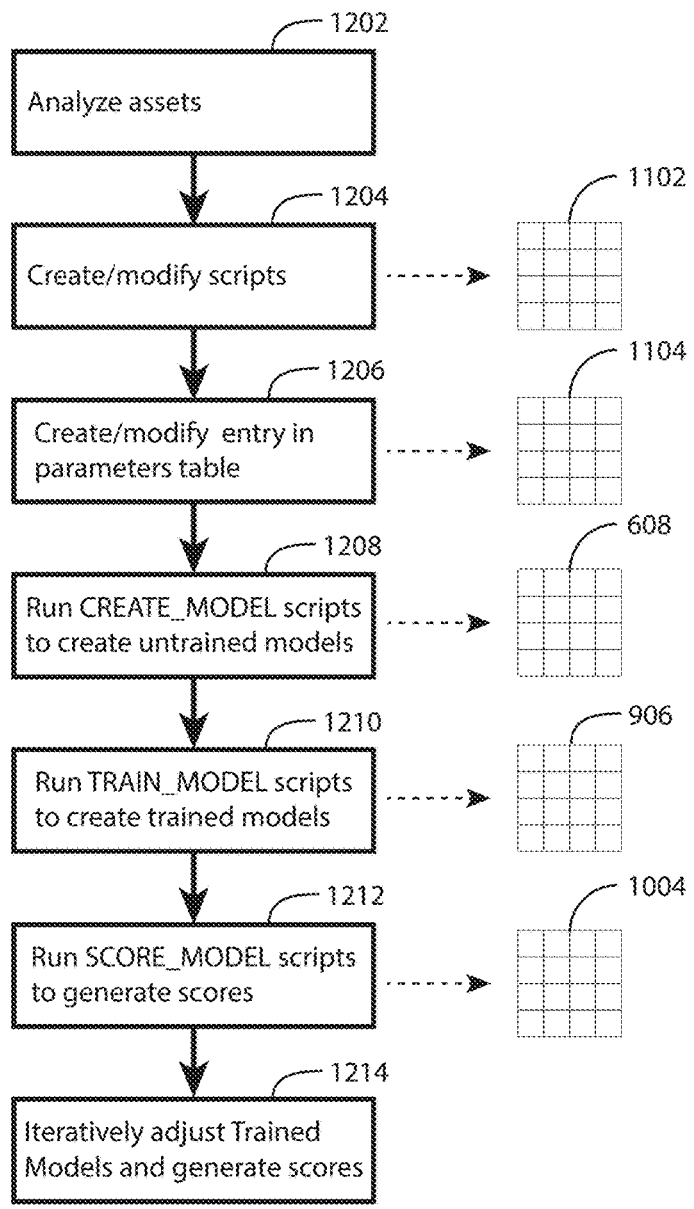
FIG. 12 is a flow chart that illustrates the process of creating, training, and scoring models.

FIG. 12 is a flow chart that illustrates the process of creating, training, and scoring models. The process begins by analyzing the assets 1202, as discussed above. Each asset to be modeled is analyzed to determine an appropriate model for the asset. For example, an asset may be analyzed to determine that a monitored output has one value if the asset is working properly and another value if the asset is malfunctioning and that a gradual movement from the working-properly value to the malfunctioning value may indicate a degradation in the condition of the asset. It may be determined that the performance of that asset may be modeled as a curve expressed as an equation (i.e., linear, quadratic, or higher order) relating the monitored output to time. A determination of the type of model to be employed may be performed for each asset to be modeled.

Determination of the type of model to be employed leads to creation and/or modification of a script 1204. The script may include a script for creation of untrained models, a script for training of untrained models, a script for scoring models, and other scripts that may be useful, such as those shown in FIG. 6C. The script is stored in the scripts table 1102, along with metadata and a unique identifier (ID). The scripts table 1102 may be created with a SQL statement such as that shown below:

CREATE TABLE SCRIPTS
(
ID BIGINT,
CODE_TYPE VARCHAR (255) CHARACTER SET UNICODE NOT CASESPECIFIC NOT NULL,
CODE BLOB (2097088000),
METADATA JSON (32000) CHARACTER SET LATIN,
ValidStart TIMESTAMP (0) WITH TIME ZONE NOT NULL,
ValidEnd TIMESTAMP (0) WITH TIME ZONE NOT NULL,
PERIOD FOR ValidPeriod (ValidStart, ValidEnd) AS VALIDTIME)
PRIMARY INDEX (ID);

In this example, the script is stored as a BLOB (Binary Large Object) object and the metadata is stored as a JSON (JavaScript Object Notation) Object. The identifier for the script is labeled and is the primary index. The table also includes a ValidTime column (ValidPeriod), so that the table is temporal. As can be seen, each script has a single row in the scripts table.

The process illustrated in FIG. 12 continues with the creation of, or modification of, one or more entries in the parameters table 1104. The entry includes two subgroups of parameters, as discussed above in connection with FIG. 6B: the sto_parameters, having to do with the process engine, and the model_parameters, having to do with the algorithm. The parameters may be converted to JSON prior to storage in the entry. The entry includes an identifier of the script or scripts against which the parameter entries are to be run. The relationship between parameter entries in the parameters table 1104 and script entries in the scripts table 1102 is many-to-many. That is, multiple entries in the parameters table 1104 may be tied to the same entry in the scripts table 1102 and multiple entries in the scripts table 1102 may be tied to the same entry in the parameters table 1104. An example table definition for the parameters table is shown below CREATE TABLE PARAMETERS
(
ID BIGINT,
ID_CODE BIGINT,
ARGUMENTS JSON (32000) CHARACTER SET LATIN,
METADATA JSON (32000),
ValidStart TIMESTAMP (0) WITH TIME ZONE NOT NULL,
ValidEnd TIMESTAMP (0) WITH TIME ZONE NOT NULL,
PERIOD FOR ValidPeriod (ValidStart, ValidEnd) AS VALIDTIME
)
PRIMARY INDEX (ID_CODE);

The ARGUMENTS parameter contains the JSON of the model parameters.

The process illustrated in FIG. 12 continues by running the CREATE_MODEL scripts 1208 to create the untrained models table 608 as discussed above in connection with FIGS. 6A, 6B, and 6C. As can be seen in FIGS. 11 and 12, the process creates multiple rows in the untrained models table 608, with each row representing a different table. The rows of the untrained models table 608 may be dispersed among a number of parallel processors with identical or different runtimes to distribute the processing load associated with the models. Further, the rows of the untrained models table 608 may be distributed to locations logically connected to the assets the untrained models are intended to model. That is, the untrained models may be stored on systems geographically near the assets being modeled or on systems readily available from locations near the assets being modeled.

The process illustrated in FIG. 12 continues by running the TRAIN_MODEL scripts 1210 to train the untrained models 608, producing the trained models table 906, as discussed above in connection with FIG. 9.

The process illustrated in FIG. 12 continues by running the SCORE_MODEL scripts 1214 to generate the scores table 1004, as discussed above in connection with FIG. 10.

The process illustrated in FIG. 12 continues by iteratively adjusting 1214 the trained models 906 and generating scores 1004 to produce satisfactory scores in the scores table 1004.

In other embodiments, model creation (block 1208) and model training (block 1210) are combined. In still other embodiments, model creation (block 1208), model training (block 1210), and model scoring (block 1212) are combined. In all of these "combination" embodiments, the untrained models may not be stored in the untrained models table 608.

Figure 13:
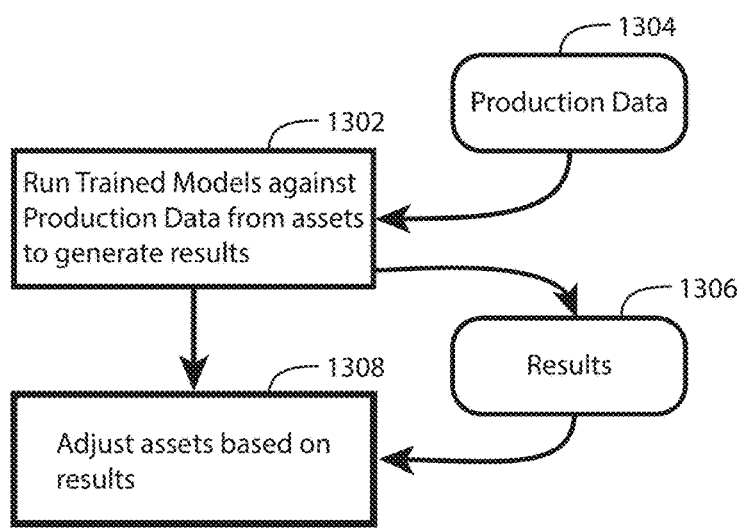
FIG. 13 illustrates the use of the trained models in production.

FIG. 13 illustrates the use of the trained models in production. In this process, the trained models in the trained models table 906 are run 1302 against production data 1304 to generate results 1306. The assets are then adjusted 1308, if necessary, based on the results.

Figure 14:
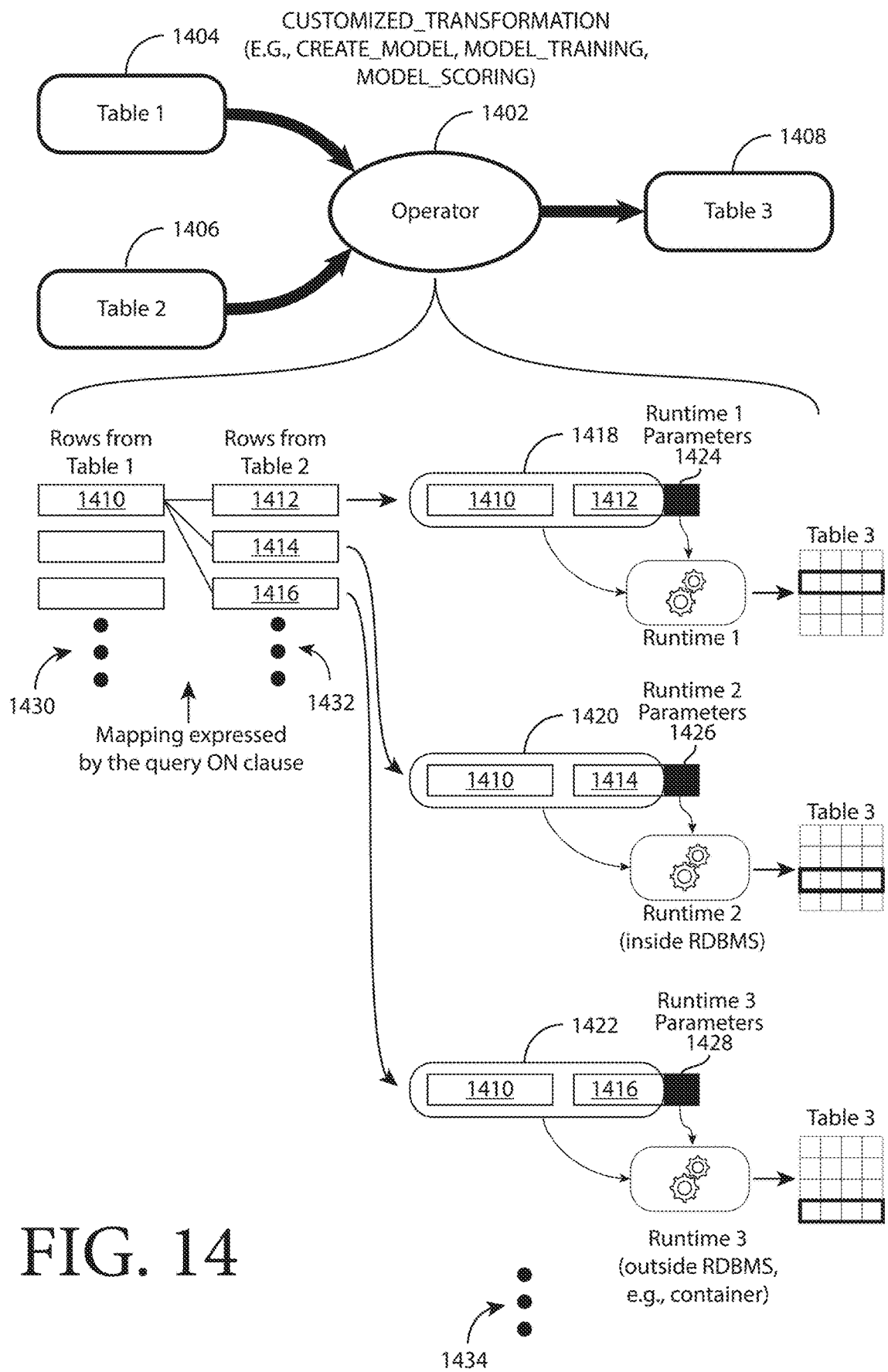
FIG. 14 illustrates the operation of a Structured Query Language (SQL) operator.

FIG. 14 illustrates a more general application of the techniques described herein. A SQL operator 1402, that would typically be incorporated in a SQL query, has two inputs, one or more rows from Table 1 1404 and one or more rows from Table 2 1406, and produces an output table, Table 3. Tables 1 and 2 may also be views or the results of other queries. The input rows from Table 1 1404 and Table 2 1406 may be selected in accordance with an ON clause of a SQL query, which defines a mapping between the rows in Table 1 and the rows in Table 2. The ON clause (or an optional WHERE clause) may also be used to filter the rows being considered by the operator. For example, row 1410 from Table 1 1404 may be matched with rows 1412, 1414, and 1416 from Table 2 1406 as shown by the connecting lines between the rows in FIG. 14. In the example shown, the operator 1402 is presented with three pairs of rows: pair 1418 (row 1410, row 1412), pair 1420 (row 1410, row 1414), and pair 1422 (row 1410, row 1412). Note that row 1410 is common to all three pairs. The operator 1402 causes each pair to be processed separately in its own runtime environment. The operator 1402 adds an entry to Table 3 1408 from the processing of each pair.

In the example shown, one of the input rows defines a customized transformation to be performed by the operator

1402, where a transformation is defined as performing processing on input data to generate an output. For example, a row from the scripts table 1102, discussed above, includes a field that contains a serialized version of scripts to instantiate, train, and score a model. Each of these is a transformation: instantiation processes a script and data to generate untrained models; training processes data, untrained models, and a script to generate trained models; and scoring processes data, trained models, and a script to generate scores. These transformations are implemented by the operator 1402 when it is manifested as the CREATE_MODEL, MODEL_TRAINING, AND MODEL_SCORING operators, respectively. As such, the transformation performed by the operator 1402 is described in one of the input tables and not hard coded in the operator itself, as is conventional, or tuned through a USING clause that lists a set of parameters disconnected from the data represented and stored as table in a database. Having the information that drives functionality in an input table makes it possible to apply set theory to complex data processing like machine learning.

The second row 1412, 1414, 1416 in the pairs 1418, 1420, 1422 contains data specific to each pair. That is, row 1412 contains data for pair 1418, row 1414 contains data for pair 1420, and row 1416 contains data for pair 1422. Each of rows 1412, 1414, 1416 includes a runtime parameters sub-row 1424, 1426, and 1428, respectively, which contain the information to specify the runtime environment and some or all of its configurations for each respective pair. The remaining portion of rows 1412, 1414, 1416 contains data to process and the parameters of the transformation to be performed by the operator 1402 itself (e.g., the model_parameters discussed above). In another embodiment, the runtime parameters sub-row is included as part of the first row, in which case the runtime parameters are specified with the transformation rather than with the parameters.

The transformation identified in the first row (i.e., row 1410) in each respective pair is then executed using the data in the second row (i.e., rows 1412, 1414, and 1416) in the runtime environment specified in the respective runtime sub-row 1424, 1426, 1428. That is, the transformation specified in row 1410 is executed using the data in row 1412 in the runtime environment specified in sub-row 1424, i.e., Runtime 1. The transformation specified in row 1410 is executed using the data in row 1414 in the runtime environment specified in sub-row 1426, i.e., Runtime 2, which may be inside the RDBMS. The transformation specified in row 1410 is executed using the data in row 1416 in the runtime environment specified in sub-row 1426, i.e., Runtime 3, which may be outside the RDBMS (i.e., in a container). Note that if the runtime parameters sub-row is included as part of row 1410, all three of the runtimes will be the same.

The ellipsis 1430 indicates the possibility of more rows from Table 1 and the ellipsis 1432 indicates the possibility of more rows from Table 2. Ellipsis 1434 indicates the possibility of more runtime environments and records for Table 3 1408 being generated by the operator 1402. As such, it can be seen that a single use of the operator 1402 can produce a large number of runtime environments.

The transformation performed by the operator 1402 may also provide settings for the operator such as for example the data type conversion from the SQL world of the RDBMS to the environment world (e.g. a Python environment), as the two environments may manage data types differently. The transformation performed by the operator 1402 may also specify a container image and a list of packages or libraries required with the proper version number. It can also specify the serialization format of an untrained or trained model when applicable (e.g. pickle, dill, joblib, ONNX, PMML, . . . ).

As such, the transformation performed by of the operator in the example would be specified by sto_parameters.

In the examples discussed above, each operator has only one functionality: CREATE_MODEL, MODEL_TRAINING, MODEL_SCORING. The same techniques could apply to a different single operator with fields in the functionality parameters (e.g. sto_parameters) like: {'engine': 'sto', 'transform': 'CREATE_MODEL'}.

Further examples consistent with the present teaching are set out in the following numbered clauses.

Clause 1. A method comprising:
executing a SQL query to perform a function, the SQL query including:
a SQL operator having:
two input relations:
a script relation having a plurality of script records, each script record including a transformation field, wherein the contents of the transformation field specify a transformation to be performed by the SQL operator, and
a parameter relation having a plurality of parameter records, each parameter record including a data-to-process field, identifying data to be processed by the transformation specified in the transformation field of a selected script record, wherein the selected script record is determined by a mapping, and
one output relation having a plurality of output records, each output record containing the result of transformation specified in a respective selected script record using the data to be processed identified in the data-to-be-processed field in a respective selected parameter record, wherein the selection of the selected script record and the selection of the selected parameter record for each output record are determined by a mapping between the script records and the parameter records; and
an ON clause that provides the mapping according to standard SQL usage dealing with JOIN operators.

Clause 2. The method of clause 1 wherein:
the SQL query includes a WHERE clause that filters the mapping according to standard SQL usage dealing with JOIN operators.

Clause 3. The method of any of the preceding clauses wherein the transformation is to instantiate a plurality of models.

Clause 4. The method of any of the preceding clauses wherein the transformation is to train a plurality of instantiated models.

Clause 5. The method of any of the preceding clauses wherein the transformation is to score a plurality of trained models.

Clause 6. The method of any of the preceding clauses wherein each parameter record includes a runtime parameters field that specifies a runtime environment for the transformation.

Clause 7. The method of any of clauses 1-5 wherein each script record includes a runtime parameters field that specifies a runtime environment for the transformation.

Clause 8. The method of any of the preceding clauses wherein the contents of the transformation field are a serialized script or a serialized object.

Clause 9. The method of any of the preceding clauses wherein the contents of the data-to-process field are serialized.

Clause 10. A non-transitory computer-readable tangible medium, on which is recorded a computer program, the computer program comprising executable instructions, that, when executed, perform a method comprising:
  executing a SQL query to perform a function, the SQL query including:
    a SQL operator having:
      two input relations:
        a script relation having a plurality of script records, each script record including a transformation field, wherein the contents of the transformation field specify a transformation to be performed by the SQL operator, and
        a parameter relation having a plurality of parameter records, each parameter record including a data-to-process field, identifying data to be processed by the transformation specified in the transformation field of a selected script record, wherein the selected script record is determined by a mapping, and
      one output relation having a plurality of output records, each output record containing the result of transformation specified in a respective selected script record using the data to be processed identified in the data-to-be-processed field in a respective selected parameter record, wherein the selection of the selected script record and the selection of the selected parameter record for each output record are determined by a mapping between the script records and the parameter records; and
      an ON clause that provides the mapping according to standard SQL usage dealing with JOIN operators.

Clause 11. The method of clause 10 wherein:
the SQL query includes a WHERE clause that filters the mapping according to standard SQL usage dealing with JOIN operators.

Clause 12. The method of any of the preceding clauses wherein the transformation is to instantiate a plurality of models.

Clause 13. The method of any of the preceding clauses wherein the transformation is to train a plurality of instantiated models.

Clause 14. The method of any of the preceding clauses wherein the transformation is to score a plurality of trained models.

Clause 15. The method of any of the preceding clauses wherein each parameter record includes a runtime parameters field that specifies a runtime environment for the transformation.

Clause 16. The method of any of clauses 10-14 wherein each script record includes a runtime parameters field that specifies a runtime environment for the transformation.

Clause 17. The method of any of the preceding clauses wherein the contents of the transformation field are a serialized script or a serialized object.

Clause 18. The method of any of the preceding clauses wherein the contents of the data-to-process field are serialized.

Clause 19. A method comprising:
  performing a process involving executing multiple SQL queries to perform respective functions, each SQL query including:
    a SQL operator having:
      two input relations:
        a script relation having a plurality of script records, each script record including a transformation field, wherein the contents of the transformation field specify a transformation to be performed by the SQL operator, and
        a parameter relation having a plurality of parameter records, each parameter record including a data-to-process field, identifying data to be processed by the transformation specified in the transformation field of a selected script record, wherein the selected script record is determined by a mapping, and
      one output relation having a plurality of output records, each output record containing the result of transformation specified in a respective selected script record using the data to be processed identified in the data-to-be-processed field in a respective selected parameter record, wherein the selection of the selected script record and the selection of the selected parameter record for each output record are determined by a mapping between the script records and the parameter records; and
      an ON clause that provides the mapping according to standard SQL usage dealing with JOIN operators;
    wherein the transformation performed by the SQL operator in a first execution is a model instantiation process;
    wherein the transformation performed by the SQL operator in a second execution is a model training process; and
    wherein the transformation performed by the SQL operator in a third execution is a model scoring process.

Clause 20. The method of clause 19 wherein:
the first execution generates untrained models;
the second execution generates trained models from the untrained models; and
the third execution generates scores for the trained models.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. A method comprising:
  executing a SQL query to perform a function, the SQL query including:
    a SQL operator having:
      two input relations:
        a script relation having a plurality of script records, each script record including a script ID and a transformation field, wherein the contents of the transformation field specify a transformation to be performed by the SQL operator for that script ID, and a parameter relation having a plurality of parameter records, each parameter record including parameter ID and a data-to-process field, identifying data to be processed by the transformation specified in the transformation field of a selected script record, and one output relation having a plurality of output records, each output record containing the result of transformation specified in a respective selected script record using the data to be processed identified in the data-to-be-processed field in a respective selected parameter record, wherein the selection of the selected script record and the selection of the selected parameter record for each output record are determined by a mapping between the script IDs of the script records and the parameter IDs of the parameter records, wherein the result of the respective transformation in each output record is a respective model; and an ON clause that provides the mapping according to standard SQL usage dealing with JOIN operators.

2. The method of claim 1 wherein:
the SQL query includes a WHERE clause that filters the mapping according to standard SQL usage dealing with JOIN operators.

3. The method of claim 1 wherein the transformation is to instantiate a plurality of models with a single execution of the SQL operator.

4. The method of claim 1 wherein the transformation is to train a plurality of instantiated models with a single execution of the SQL operator.

5. The method of claim 1 wherein the transformation is to score a plurality of trained models with a single execution of the SQL operator.

6. The method of claim 1 wherein each parameter record includes a runtime parameters field that specifies a runtime environment for the transformation.

7. The method of claim 1 wherein each script record includes a runtime parameters field that specifies a runtime environment for the transformation.

8. The method of claim 1 wherein the contents of the transformation field include a serialized script or a serialized object.

9. The method of claim 1 wherein the contents of the data-to-process field are serialized.

10. A non-transitory computer-readable tangible medium, on which is recorded a computer program, the computer program comprising executable instructions, that, when executed, perform a method comprising:
executing a SQL query to perform a function, the SQL query including:
a SQL operator having:
two input relations:
a script relation having a plurality of script records, each script record including a script ID and a transformation field, wherein the contents of the transformation field specify a transformation to be performed by the SQL operator for that script ID, and
a parameter relation having a plurality of parameter records, each parameter record including parameter ID and a data-to-process field, identifying data to be processed by the transformation specified in the transformation field of a selected script record, and one output relation having a plurality of output records, each output record containing the result of transformation specified in a respective selected script record using the data to be processed identified in the data-to-be-processed field in a respective selected parameter record, wherein the selection of the selected script record and the selection of the selected parameter record for each output record are determined by a mapping between the script IDs of the script records and the parameter IDs of the parameter records, wherein the result of the respective transformation in each output record is a respective model; and an ON clause that provides the mapping according to standard SQL usage dealing with JOIN operators.

11. The method of claim 10 wherein:
the SQL query includes a WHERE clause that filters the mapping according to standard SQL usage dealing with JOIN operators.

12. The method of claim 10 wherein the transformation is to instantiate a plurality of models with a single execution of the SQL operator.

13. The method of claim 10 wherein the transformation is to train a plurality of instantiated models with a single execution of the SQL operator.

14. The method of claim 10 wherein the transformation is to score a plurality of trained models with a single execution of the SQL operator.

15. The method of claim 10 wherein each parameter record includes a runtime parameters field that specifies a runtime environment for the transformation.

16. The method of claim 10 wherein each script record includes a runtime parameters field that specifies a runtime environment for the transformation.

17. The method of claim 10 wherein the contents of the transformation field include a serialized script or a serialized object.

18. The method of claim 10 wherein the contents of the data-to-process field are serialized.

19. A method comprising:
performing a process involving executing multiple SQL queries to perform respective functions, each SQL query including:
a SQL operator having:
two input relations:
a script relation having a plurality of script records, each script record including a script ID and a transformation field, wherein the contents of the transformation field specify a transformation to be performed by the SQL operator for that script ID, and
a parameter relation having a plurality of parameter records, each parameter record including parameter ID and a data-to-process field, identifying data to be processed by the transformation specified in the transformation field of a selected script record, and
one output relation having a plurality of output records, each output record containing the result of transformation specified in a respective selected script record using the data to be processed identified in the data-to-be-processed field in a respective selected parameter record, wherein the selection of the selected script record and the selection of the selected parameter record for each output record are determined by a mapping between the script IDs of the script records and the parameter IDs of the parameter records, wherein the result of the respective transformation in each output record is a respective model; and an ON clause that provides the mapping according to standard SQL usage dealing with JOIN operators;

wherein the transformation performed by the SQL operator in a first execution is a model instantiation process;

wherein the transformation performed by the SQL operator in a second execution is a model training process; and wherein the transformation performed by the SQL operator in a third execution is a model scoring process.

20. The method of claim 19 wherein:

the first execution generates untrained models;

the second execution generates trained models from the untrained models; and the third execution generates scores for the trained models.

\* \* \* \* \*